United States Patent [19]

Klomp

[11] 4,394,091

[45] Jul. 19, 1983

[54] AIR BEARING AND ANTIFRICTION BEARING ASSEMBLY

[75] Inventor: Edward D. Klomp, Mount Clemens, Mich.

[73] Assignee: General Motors Corporation, Detroit, Mich.

[21] Appl. No.: 309,934

[22] Filed: Oct. 9, 1981

[51] Int. Cl.³ .................. F16C 21/00; F16C 35/07
[52] U.S. Cl. ............................. 384/101; 384/102; 384/126; 308/189 R
[58] Field of Search ........ 308/35, 9, DIG. 1, DIG. 4, 308/189 R, 201; 384/101, 100, 102, 126

[56] References Cited

U.S. PATENT DOCUMENTS

| 3,305,280 | 2/1967 | Peterson | 308/35 |
| 3,603,654 | 9/1971 | Bird | 308/35 |
| 3,642,331 | 2/1972 | Silver | 308/35 |

OTHER PUBLICATIONS

General Motors, Gas/Ball Bearings, May 1962.

Primary Examiner—Stuart S. Levy
Assistant Examiner—Thomas R. Hannon
Attorney, Agent, or Firm—Patrick M. Griffin

[57] ABSTRACT

A hybrid bearing assembly includes a shaft rotatably supportable within a shaft housing by a hydrodynamic foil bearing acting in parallel with an antifriction bearing. The shaft is supported solely by the antifriction bearing at zero and low shaft speeds, and is supported solely by the foil bearing at the running speed. As the shaft accelerates from low speeds through running speed, support of the shaft is shared between the antifriction bearing and the foil bearing which act in parallel.

3 Claims, 5 Drawing Figures

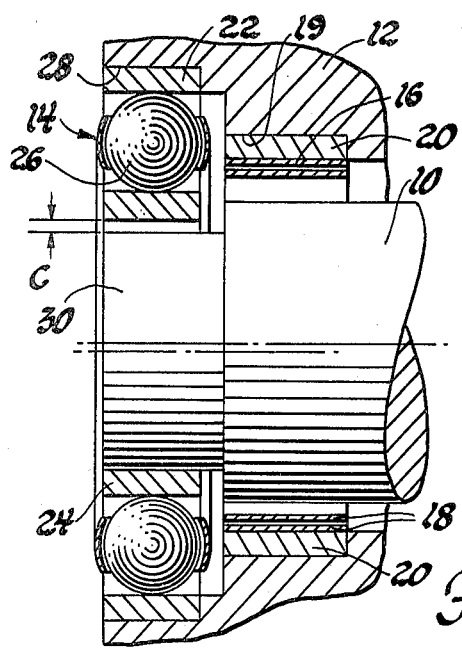
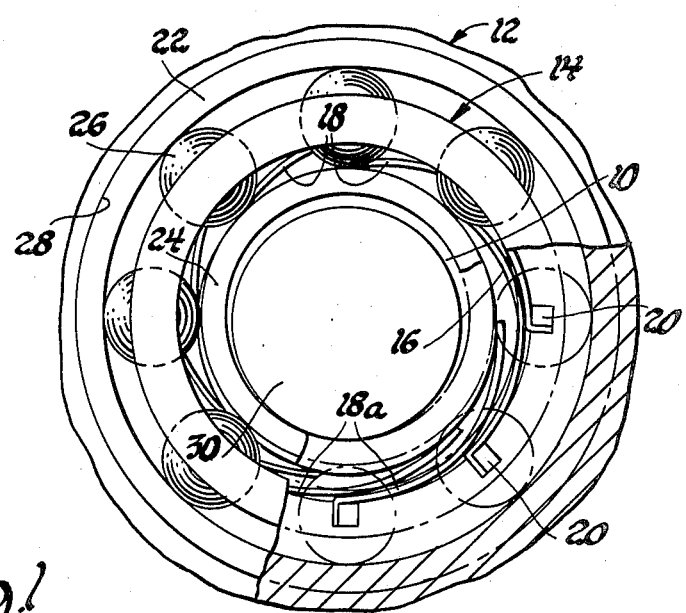
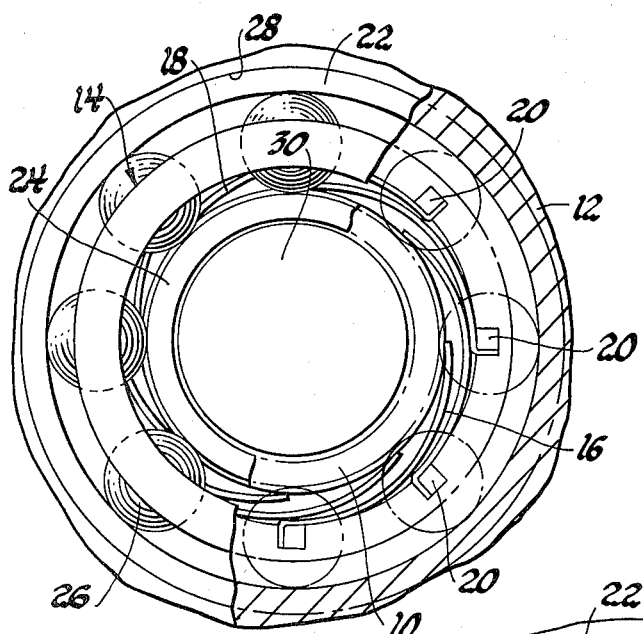
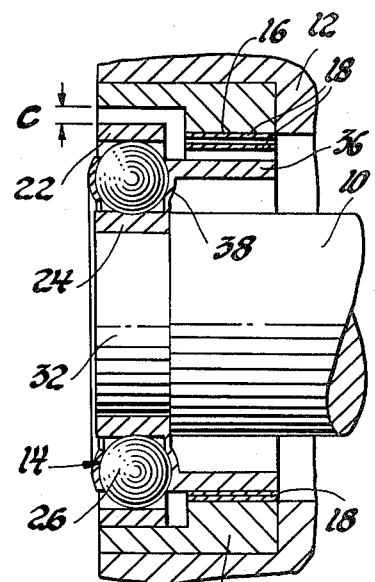
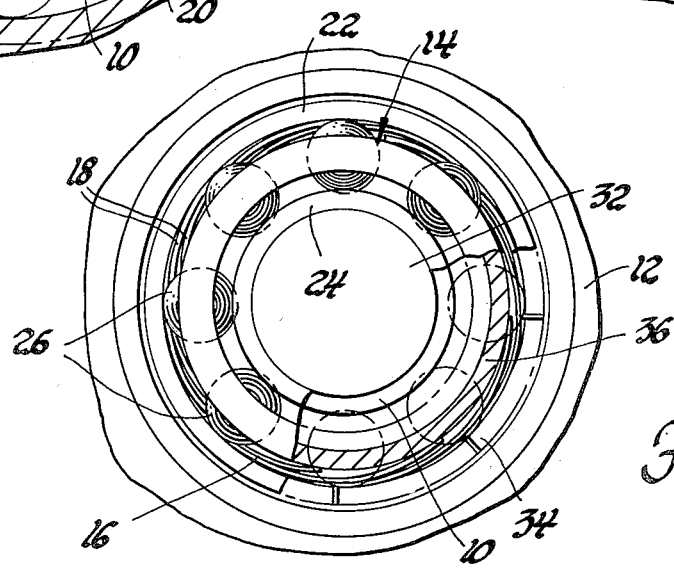

AIR BEARING AND ANTIFRICTION BEARING ASSEMBLY

BACKGROUND OF THE INVENTION

Air bearings offer a great advantage over conventional bearings where very high shaft speeds are involved. The shaft rides within the shaft housing on a thin film of fluid, such as air, and the frictional resistance is very slight. This fluid film may be created by having the bearings externally pressurized or the fluid film may be created by the action of the shaft rotating rapidly proximate a series of overlapping foils mounted to the shaft housing. These foils create wedge shaped gaps proximate the shaft and a velocity gradient is established in the boundary layer of air between the shaft and the foils. The viscous or shear forces in this boundary layer draw fluid into the wedge shaped gaps to create the film.

At zero speed there is a relatively high breakaway torque since the shaft rests on the foils in the bottom of the shaft housing. At low speed, there is high sliding friction caused by the rubbing of the shaft on the foils before the hydrodynamic action has taken effect. Also, there is a relatively large clearance between the shaft and the shaft housing in a typical hydrodynamic fluid type bearing since the center line of the shaft moves significantly in a radial direction as the shaft speed increases from zero to a running speed where the center line is substantially concentric with the center line of the shaft housing with only a relatively small, minimum running eccentricity. Devices such as gas turbines do not run efficiently where there is such a large difference between the static and running positions of the shaft center line.

The prior art shows antifriction bearings in series with air bearings as a safety or backup feature. The bearings cannot operate in parallel. For example, Bird U.S. Pat. No. 3,603,654 discloses an antifriction bearing between the shaft housing of the air bearing and a larger support member. A frangible link allows the antifriction bearing to take over in the event that the air bearing seizes. A similar structure produced by General Motors in 1962 had high friction built into the antifriction bearing so that the air bearing was operative almost immediately as the shaft began to turn. Thus, in both structures, the antifriction bearing was only a backup to take over in case of failure of the air bearing.

SUMMARY OF THE INVENTION

The present invention solves the problems of low speed friction in air bearings and high shaft eccentricity by cooperatively supporting a rotating shaft with an antifriction bearing in parallel with a hydrodynamic foil bearing. The shaft is supported within the shaft housing solely by the antifriction bearing when the shaft is at zero speed and low speeds. The antifriction bearing releases its support of the shaft and the hydrodynamic foil bearing acts as the sole support of the shaft when the shaft reaches a predetermined running speed. Support of the shaft is shared between the two bearings, which act in parallel, as the shaft accelerates and decelerates between low speeds and the predetermined running speed.

In one embodiment of the invention, a rotatable shaft is received within the inner race of an antifriction bearing, the outer race of which is secured to the shaft housing. The OD of the shaft and the ID of the inner race are spaced by a predetermined clearance. A hydrodynamic foil bearing is supported in the shaft housing in parallel with the antifriction bearing and includes a series of overlapping foils which surround the shaft. At zero speed, the shaft rests on the inner race. At low shaft speeds, the shaft is in frictional contact with the inner race of the antifriction bearing which carries the entire load. As the shaft accelerates, the hydrodynamic action of the foils begins to act on the shaft and the load of the shaft is shared between the two bearings. At a predetermined running speed, the shaft is supported solely by the air film created by the hydrodynamic foils and the clearance between the shaft and the inner race is sufficient at the running speed to prevent the shaft from contacting the inner race of the antifriction bearing. This sequence is reversed as the shaft decelerates from the predetermined running speed to zero speed.

In a second embodiment of the invention, the inner race of the antifriction bearing is secured to the shaft and the OD of the outer race and the ID of the housing are spaced with a predetermined clearance. The separator cage of the antifriction bearing has a cylindrical extension which surrounds the shaft and which is confronted by hydrodynamic bearing foils mounted to the shaft housing. At zero speed and low speeds, the shaft is supported by the antifriction bearing as the outer race of the antifriction bearing rests on the shaft housing. At a predetermined running speed, the foils solely support the cage extension on a fluid film. Concurrently, the antifriction bearing is coaxially located within the shaft housing with the outer race of the antifriction bearing coaxially spaced from the shaft housing. The reverse sequence occurs as the shaft decelerates.

In both embodiments, the problems of static and startup friction in the foil bearing are solved by the support provided by the antifriction bearing at zero speed and low speeds. In addition, the differential between the initial and final position of the shaft center line is less than with a conventional hydrodynamic foil bearing alone as a great deal of the differential which would otherwise exist is taken up by the antifriction bearing.

BRIEF DESCRIPTION OF THE DRAWING

These and other features of the invention will appear from the following written description and drawings in which:

FIG. 1 is a cross-sectional view of a shaft and shaft housing supported by an antifriction bearing and foil bearing according to one embodiment with the shaft in static position.

FIG. 2 is an end view of the shaft and shaft housing, with the shaft in static position.

FIG. 3 is a partially broken away view similar to FIG. 2 and showing the shaft at a predetermined running speed.

FIG. 4 is a view of an alternate embodiment of the invention, similar to FIG. 1, and with the shaft in static position, and FIG. 5 is a partially broken away end view of the embodiment of FIG. 4 with the shaft at a predetermined running speed.

DESCRIPTION OF THE PREFERRED EMBODIMENTS

Referring first to FIG. 1, an axially extending shaft designated generally 10 is rotatably received within a counterbored shaft housing designated generally 12. A conventional ball or antifriction bearing designated generally 14 is mounted within shaft housing 12 adjacent to a conventional hydrodynamic foil bearing designated generally 16. Antifriction bearing 14 and hydrodynamic foil bearing 16 act in parallel to support shaft 10 as will be more fully described.

Hydrodynamic bearing 16 includes a series of overlapped foils 18 conventionally mounted to a shouldered bore portion 19 of shaft housing 12 by pressure fitted blocks 20 or other suitable attachment. Foils 18 confront the outside surface of shaft 10 as in a conventional foil bearing. If hydrodynamic foil bearing 16 were used alone in the absence of the antifriction bearing 14, shaft 10 would, in the static position, rest on the lower or bottom foils 18a within bore portion 19. In this static position, there would be a maximum static eccentricity or clearance between the center lines or axes of shaft 10 and housing 12 referred to as $E_s$. The shaft would have to overcome the breakaway torque caused by static friction and the grabbing force of the foils 18a before it began to rotate. At low speeds the shaft would rub on foils 18a. This would continue until the shaft reached a predetermined liftoff speed where the hydrodynamic foils would begin to form a fluid film and lift the shaft. At this point the shaft would be running with a smaller eccentricity between the center lines of the shaft and the shaft housing, referred to as $E_1$. Finally, at a predetermined running speed, the hydrodynamic foil bearing would provide the sole support of the shaft and the running eccentricity between the center lines of the shaft and the shaft housing would be substantially zero, referred to as $E_r$. The foregoing describes conventional operation of a foil bearing. The differential between $E_s$ and $E_r$ is so large as to be unsuitable for certain applications such as gas turbines.

Antifriction bearing 14 solves the above outlined problems of a conventional hydrodynamic foil bearing. Antifriction bearing 14 is of the conventional ball type, although other types of antifriction bearings can be used. Bearing 14 includes an outer race 22, an inner race 24 and a complement of caged balls 26 in rolling contact therebetween. The end of shaft housing 12 includes a shouldered bore portion 28 into which outer race 22 is press fitted, so that balls 26 are in effect carried by shaft housing 12. Shaft 10 includes an axially extending portion 30 of reduced diameter which extends through inner race 24. The maximum predetermined clearance between the ID of inner race 24 and the OD of shaft portion 30 is designated clearance C.

The magnitude of clearance C is less than $E_s$, greater than but close in magnitude to $E_1$, and greater than $E_r$. Thus, at zero speed and low speeds, below liftoff speed, the rolling elements 26 of antifriction bearing 14 provide the sole support of the shaft 10 since the reduced diameter portion 30 of shaft 10 rests only on inner race 24 and cannot rest on or rub on foils 18a. As the shaft 10 accelerates from low speed to liftoff speed, the support of the shaft 10 will begin to be shared by the bearings 14 and 16 in parallel. As shaft 10 approaches the liftoff speed, the shaft will be supported almost entirely by foil bearing 16 and the reduced diameter portion 30 of the shaft will begin to lift from inner race 24. As the shaft moves through liftoff speed to running speed, the reduced diameter portion 30 will lift entirely from the inner race 24 and balls 26. Shaft 10 will then be supported solely by the foil bearing 16 since clearance C is greater than $E_r$.

Thus it may be seen that the parallel arrangement of the bearings 14 and 16 overcomes the problems of high breakaway torque and high sliding friction of the shaft on the foils at zero and low shaft speeds. In addition, the magnitude of movement of the center line of shaft 10 relative to the center line of housing 12 between zero speed and running speed is equal only to the lesser clearance C and not the greater static eccentricity $E_s$. Thus the assembly of this invention will work in applications, such as gas turbines, where there must be a limited magnitude of movement of the shaft between zero and running speeds.

FIGS. 4 and 5 show an alternate embodiment of the invention. In this embodiment, the inner race 24 of ball or antifriction bearing 14 is press fitted to a matching reduced diameter portion 32 of shaft 10. The outer race 22 of bearing 14 rests, in the static position shown, on the bottom of a shouldered insert 34 which also serves to support foils 18 in shaft housing 12. The clearance C is of a magnitude similar to that in the first embodiment but exists between outer race 22 and the insert 34. The foils 18 confront a cylindrical extension 36 of the cage member 38. Cylindrical extension 36 turns at the same speed as the centers of the balls 26, approximately half the shaft speed, since it is located approximately halfway between the inner and outer races 22 and 24 of bearing 14. The eccentricities previously discussed, $E_s$, $E_1$, and $E_r$ all bear the same relation to clearance C as discussed in the first embodiment.

At zero shaft speeds and low shaft speeds, outer race 22 rests upon insert 34 of shaft housing 12 whereby antifriction bearing 14 solely supports shaft 10 as in the previous embodiment. As the shaft accelerates, cylindrical extension 36 will begin to turn at approximately half the speed of shaft 10. Since the foils 18 confront the cylindrical extension 36 rather than the shaft 10, the shaft will have to approach approximately twice the liftoff speed of the previous embodiment before the foils will begin to lift the extension 36 and concurrently lift shaft 10 and outer race 22 from the insert 34 of the shaft housing 12. When liftoff occurs, the clearance C, as discussed above, ensures that the outer race 22 moves out of contact with the insert 34 of housing 12 and the cylindrical extension 36 accelerates toward shaft speed. As in the previous embodiment, the support of the shaft 10 is shared between bearing 14 and bearing 16 as the shaft accelerates between zero and liftoff speed. While the liftoff speed necessary is approximately twice that of the first embodiment, there is a concurrent torque multiplication factor of approximately 2, the torque available to move the cylindrical extension 36 being approximately twice the torque input to the shaft 10. Thus, the second embodiment is useful where the grabbing force of the foils 18 is very large. As the shaft slows down from running speed, the outer race 22 will reengage the insert 34 at approximately half the speed necessary for liftoff.

Other embodiments of the invention are possible. What is required is to maintain a circular complement of rolling antifriction elements in the space between the shaft and the shaft housing with the eccentric spacing from the shaft described so that the rolling elements solely support the shaft at zero and low speeds, while the eccentric spacing assures that the shaft will move relative to the circular elements and be solely supported by the hydrodynamic foils at running speed. Tying the inner or outer races of a conventional ball bearing to the shaft or the shaft housing as shown provides convenient ways of achieving this.

In both embodiments of the invention, the antifriction bearing provides low friction support for the shaft at zero speed and low speeds until such time as the foil bearing takes over the sole support of the shaft. In addition, both embodiments reduce the amount of movement between the axes of the shaft and the shaft housing as the shaft accelerates from zero speed to running speed.

The embodiments of the invention in which an exclusive property or privilege is claimed are defined as follows:

1. A hydrodynamic foil bearing and anti-friction bearing assembly, comprising, a shaft housing member having an axial bore, a rotatable shaft member receivable within the axial bore with a predetermined maximum static eccentricity between the axis of the axial bore and the axis of the shaft member when the shaft member is at zero speed, a hydrodynamic foil bearing within the axial bore for rotatably supporting the shaft member at a predetermined rotational speed with a predetermined minimum running eccentricity between the axis of the axial bore and the axis of the shaft member, an antifriction bearing element within the axial bore axially adjacent the hydrodynamic foil bearing and including inner and outer races and a complement of rolling elements disposed therebetween, one of the races being secured to one member of the shaft and housing members and the other race being engageable with the other member of the shaft and housing members at zero shaft speed and at low shaft speeds, the other race being eccentrically spaced from the other member by an amount which is less than the maximum static eccentricity and greater than the minimum running eccentricity whereby the bearing element provides the sole support of the shaft member at zero speed, the support of the shaft member being shared between the bearing element and the foil bearing as the shaft member accelerates from zero shaft speed to running shaft speed, with the shaft member being solely supported by the foil bearing at running speed as the other race of the bearing element moves away from the other member and the shaft member rotates within the axial bore at the predetermined minimum running eccentricity.

2. A hydrodynamic foil bearing and antifriction bearing assembly, comprising, a shaft housing member having an axial bore, a rotatable shaft receivable within the axial bore with a predetermined maximum static eccentricity between the axis of the shaft and the axis of the axial bore when the shaft is at zero speed, a hydrodynamic foil bearing within the axial bore for rotatably supporting the shaft within the housing at a predetermined shaft running speed with a predetermined minimum running eccentricity between the axes of the shaft and of the axial bore, an antifriction bearing within the axial bore axially adjacent the hydrodynamic foil bearing and including a complement of rolling elements disposed between inner and outer races, the outer race being secured within the axial bore of the shaft housing and the shaft being received through the inner race and supported thereon when the shaft is at zero and low speeds, the inner race being eccentrically spaced from the shaft by an amount which is smaller in magnitude than the predetermined maximum static eccentricity and larger in magnitude than the predetermined running eccentricity when the shaft is at zero and low speed, the support of the shaft being shated between the antifriction bearing and the hydrodynamic foil bearing as the shaft accelerates from low speed to running speed, with the shaft being entirely supportd within the shaft housing by the hydrodynamic foil bearing as the shaft disengages from the inner race and rotates within the shaft housing with the predetermined minimum eccentricity.

3. A hydrodynamic foil bearing and antifriction bearing assembly, comprising, a shaft housing member having an axial bore, a rotatable shaft receivable within the axial bore with a predetermined maximum static eccentricity between the axis of the shaft and the axis of the axial bore when the shaft is at zero speed, a hydrodynamic foil bearing within the axial bore for rotatably supporting the shaft within the housing at a predetermined shaft running speed with a predetermined minimum running eccentricity between the axes of the shaft and of the axial bore, an antifriction bearing within the axial bore axially adjacent the hydrodynamic foil bearing and including a complement of rolling elements disposed between inner and outer races, with the inner race being secured to the shaft and the outer race resting on the axial bore of the shaft housing and supporting the shaft at zero and low shaft speeds and being eccentrically spaced from the axial bore of the shaft housing by an amount which is smaller in magnitude than the predetermined maximum static eccentricity and larger in magnitude than the predetermined running eccentricity, support of the shaft being shared between the antifriction bearing and the hydrodynamic foil bearing as the shaft accelerates from low speed to running speed, with the shaft being entirely supported within the shaft housing by the hydrodynamic foil bearing at running speed as the outer race is disengaged from the axial bore of the shaft housing and the shaft rotates within the axial bore of the shaft housing with the predetermined running eccentricity.

* * * * *